UNITED STATES PATENT OFFICE.

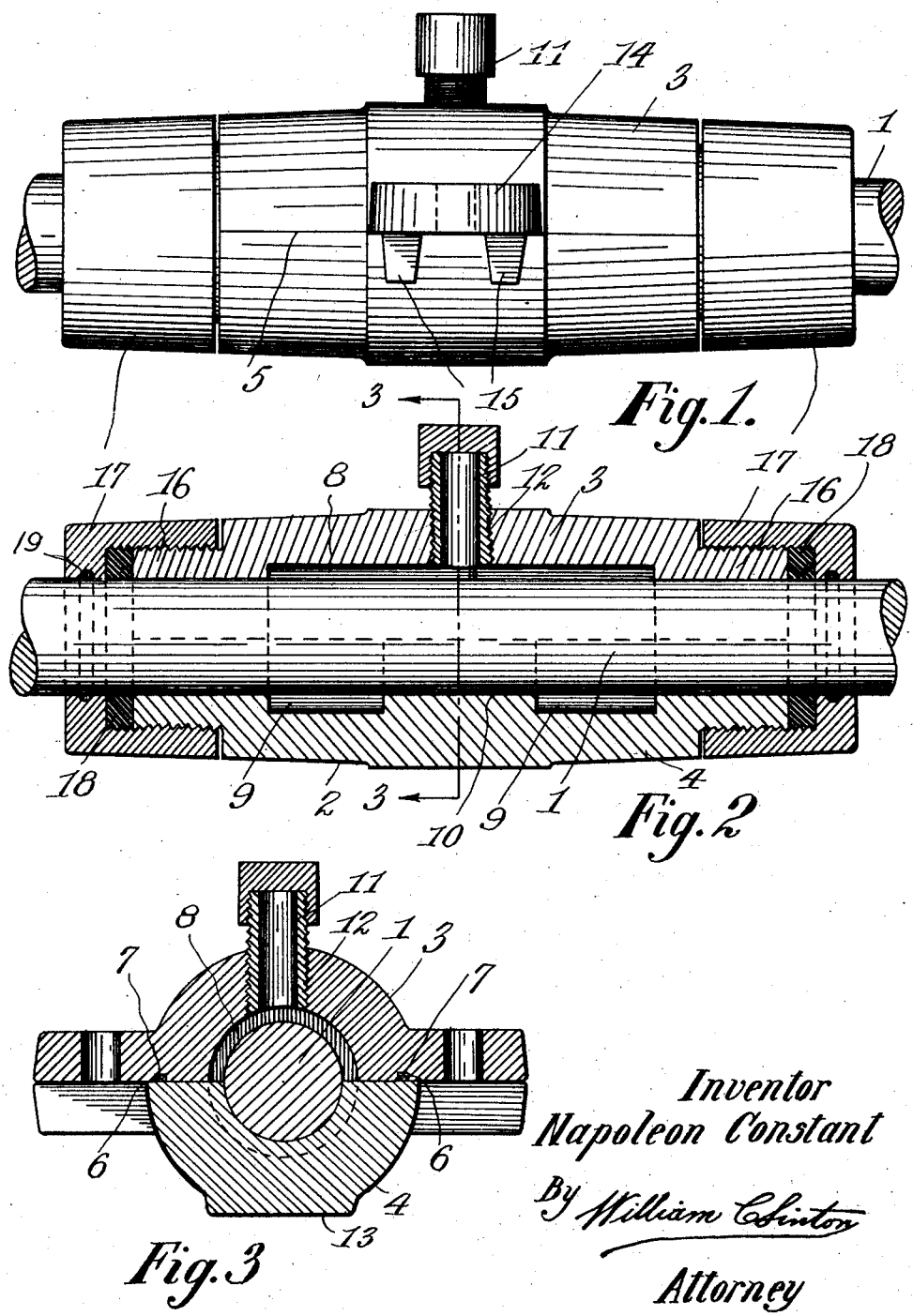

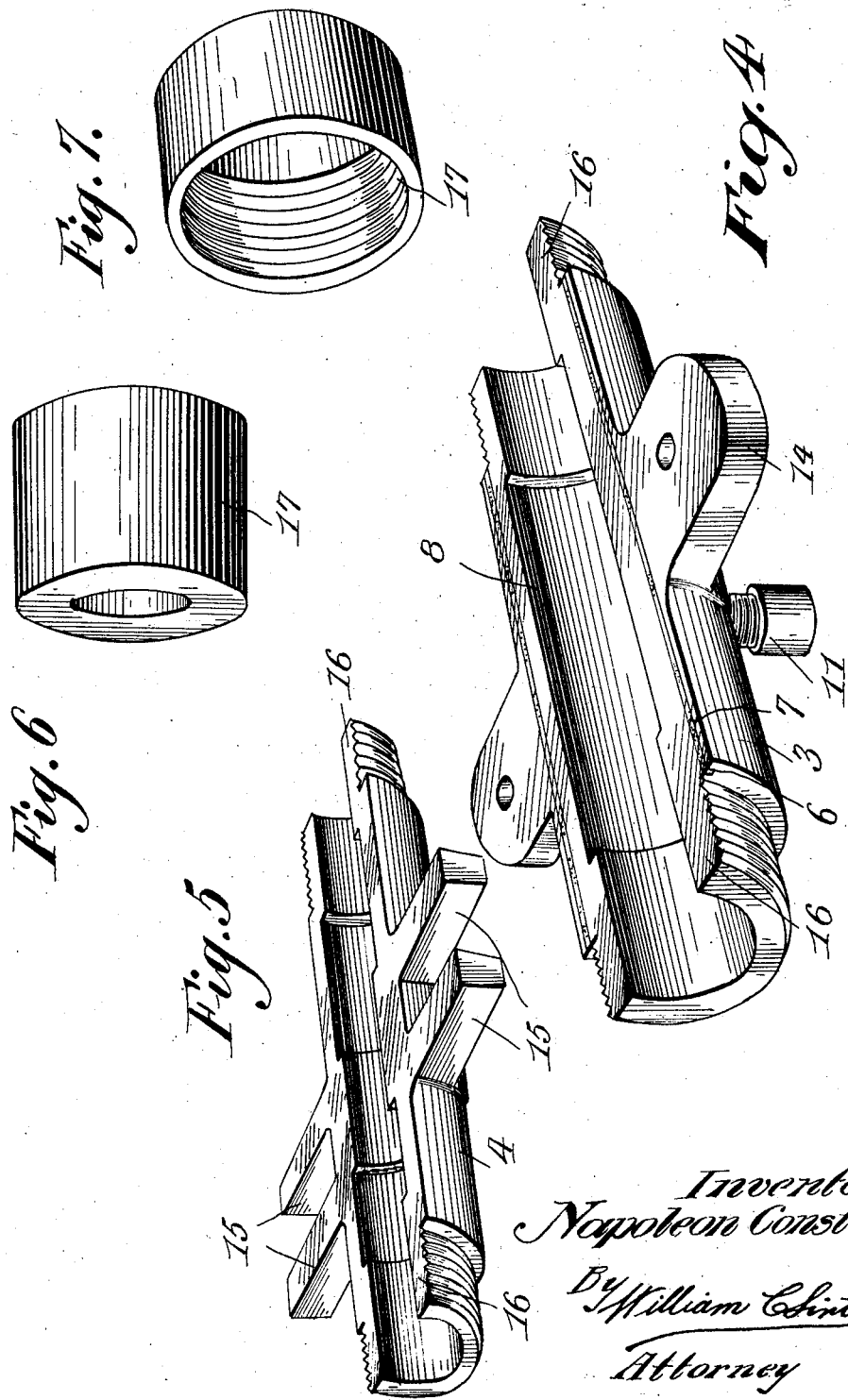

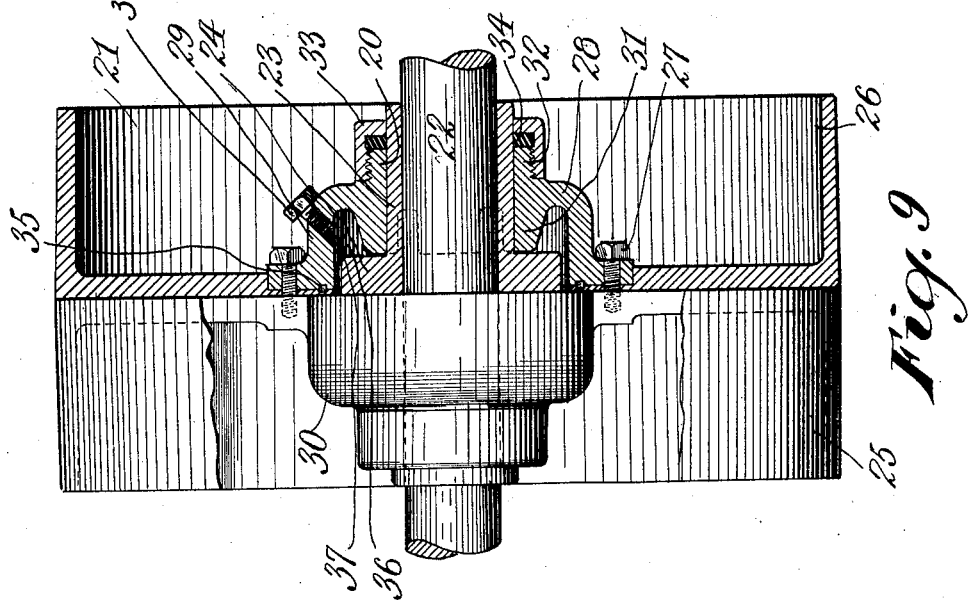
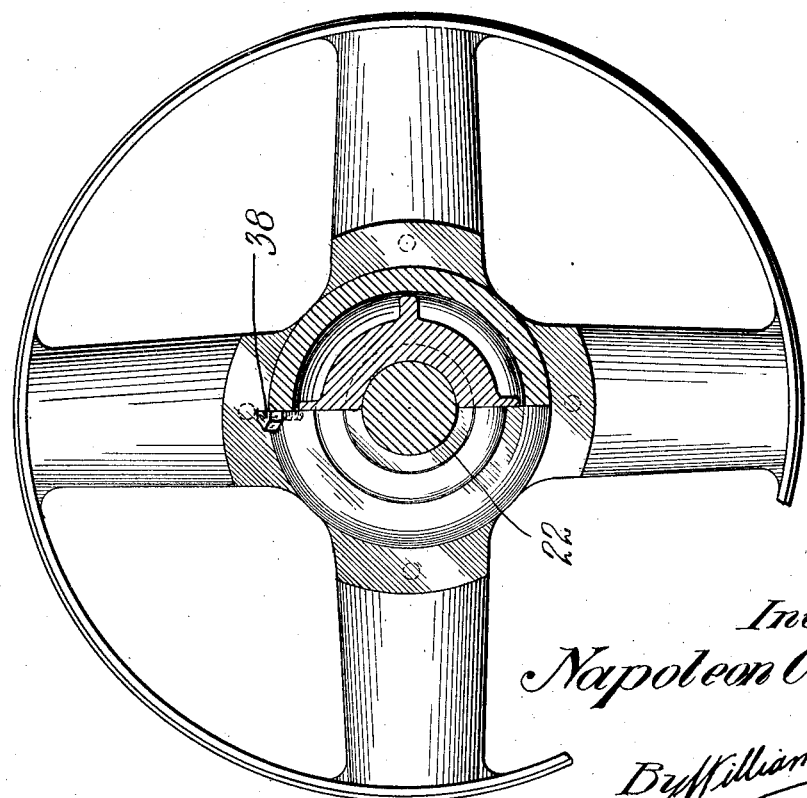

NAPOLEON CONSTANT, OF MANCHESTER, NEW HAMPSHIRE.

BEARING.

1,389,127.     Specification of Letters Patent.     Patented Aug. 30, 1921.

Application filed September 1, 1920. Serial No. 407,296.

*To all whom it may concern:*

Be it known that I, NAPOLEON CONSTANT, a citizen of the United States of America, residing at Manchester, State of New Hampshire, have invented certain new and useful Improvements in Bearings; and I do hereby declare that the following is a full, clear, and exact description of the invention, such as will enable others skilled in the art to which it appertains to make and use the same.

The present invention relates to improvements in bearings and more particularly to that class designed especially for use in connection with shafting, pulleys, and the like.

The primary object of the invention is the provision in a bearing such as above referred to, of means for lubricating the same and preventing such lubricating elements from working out through the sides or ends of the bearing.

A further object of the invention is the provision of a bearing formed in a plurality of sections which can be quickly separated for the purpose of either renewing the same or replacing a shaft or pulley.

A still further object of the invention is the provision of a bearing such as above referred to, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawings forming a part of the present application, and in which:

Figure 1 is a side elevation of a bearing for supporting a shaft, constructed in accordance with the present invention;

Fig. 2 is a longitudinal sectional view thereof;

Fig. 3 is a transverse sectional view taken on the line 3—3 of Fig. 2;

Fig. 4 is a detail perspective view of the upper half of the bearing;

Fig. 5 is a similar view of the lower half of the bearing;

Fig. 6 is a similar view of one of the caps looking at the outer end thereof;

Fig. 7 is a similar view looking at the opposite end of the cap;

Fig. 8 is an edge view showing the bearing constructed for application to a pulley; and, Fig. 9 is a side view showing the same with parts of the pulley sections broken away.

Referring now to the accompanying drawings by corresponding characters of reference throughout the several views, the numeral 1 designates in general a portion of a shaft mounted in a bearing 2 constructed in accordance with the present invention.

The bearing 2 comprises upper and lower sections 3 and 4 split horizontally as at 5. The lower edges of the upper section 3 are provided throughout their lengths upon opposite sides of the shaft 1 with grooves 6 adapted to hold suitable packings 7, which prevents any leakage of the lubricant from the interior of the bearing out through the edges thereof. The interior of the upper section is provided with a channel 8 for receiving the lubricant, while the interior of the lower section is provided with a pair of spaced channels 9 which are disposed in alinement with the channel 8, forming therebetween a seat 10 upon which the shaft 1 rests, as clearly shown in Figs. 2 and 3.

A suitable oil cup 11 is threaded in an opening 12 formed centrally of the upper section 3 through which the lubricant may be fed into the channels 8 and 9 to properly lubricate the said shaft 1. The bearing 4 is substantially circular in cross section, as clearly shown in Fig. 3, having, however, its lower side flattened at 13 to form a seat for the same which may rest upon any convenient support to which it may be clamped by suitable fastening devices (not shown) which may pass through the openings in the lugs 14 formed upon the opposite sides of the section 3 and between the spaced lugs 15 formed upon opposite sides of the lower section 4.

The ends of the bearing 2 are reduced, as shown at 16, and threaded to receive the threaded caps 17 adapted to be inserted over the ends of the shaft 1 and screwed thereon. Suitable packings 18 are placed between the ends of the bearing 2 and the caps 17 to prevent leakage of the lubricant through the ends of said bearing, and additional packings 19 may be also provided for the caps, if desired.

As shown particularly in Figs. 8 and 9 of the drawings, the bearing 20 is slightly changed to adapt the same for use in connection with mounting a loose pulley 21 upon the shaft 22. A suitable sleeve, shown at 23, is secured to the shaft 22 to rotate therewith, and to hold the pulley 21 against longitudinal displacement upon the same. This sleeve 23, or bushing, is provided with the usual shoulder 24 formed intermediate its ends.

The pulley 21 consists of two detachable sections 25 and 26 secured together by bolts or other suitable fastening devices 27. The hub of this pulley forms a bearing 28 which carries out the principles of the above described bearing 2. This bearing 28 is formed in two sections 29 and 30, held together by the fastening devices 27 which secure the pulley sections 25 and 26 together. The bearing 28 is circular in formation, having inwardly directed lugs 31 which abut against the outer ends of the shoulder 24, thus holding the pulley against longitudinal displacement upon the bushing 23 and shaft 22 to which the said bushing is fixed.

The ends of the casing sections 29 and 30 of the bearing 28 are reduced, as at 32 and threaded to receive the caps 33 which correspond to the before mentioned caps 17. A suitable packing 34 is placed within the said caps 33 between the ends thereof and the adjacent ends of the bearing sections 29 and 30, while, in order to insure further displacement of the lubricant from the bearing, an additional packing 35 is placed in grooves at the meeting edges of the sections 29 and 30.

The bearing 28 has a lubricant chamber or compartment 36 formed therein through which the said lubricant can be placed through an opening 37 closed by a screw plug 38.

From the foregoing description taken in connection with the accompanying drawings, it will be manifest that a bearing is provided which will fulfil all of the necessary requirements of such a device.

It should be further understood in this connection, that various minor changes in the specific details of construction can be resorted to within the scope of the appended claims, without departing from the spirit or sacrificing any of the advantages of the invention.

Having thus fully described the invention, what I claim as new and desire to protect by Letters Patent is:—

1. A bearing comprising two sections, packings disposed between the meeting edges of the sections, the ends of said sections being reduced and threaded, caps threaded upon the ends of the sections, and packing disposed between the ends of said sections and caps.

2. A bearing including a pair of sections, grooves in said sections alining and forming a lubricant compartment, means for feeding lubricant into said compartment, the ends of the sections of the bearing being reduced and threaded, caps threaded upon the reduced ends of said sections, and packings disposed between the ends of the bearing sections and caps.

3. The combination with a shaft or the like, of a split bearing including a pair of corresponding sections, the contacting edges of said sections having grooves provided therein, packings inserted in said grooves, an oil compartment formed within said sections for containing lubricant, the ends of said sections being reduced and threaded, caps engaging the shaft and having threaded engagement with the ends of the sections, and packings inserted between the ends of the sections and caps and engaging the shaft, substantially as and for the purposes set forth.

In witness whereof I have hereunto set my hand.

NAPOLEON CONSTANT.